No. 622,944. Patented Apr. 11, 1899.
W. T. EBERT.
TRAP.
(Application filed Mar. 28, 1898.)

(No Model.) 3 Sheets—Sheet 1.

WITNESSES: INVENTOR
Francis H. Anglin W. T. Ebert
J. P. Appleman. BY
H. C. Everett Co
ATTORNEYS

THE NORRIS PETERS CO., PHOTO-LITHO., WASHINGTON, D. C.

No. 622,944. Patented Apr. 11, 1899.
W. T. EBERT.
TRAP.
(Application filed Mar. 28, 1898.)
(No Model.) 3 Sheets—Sheet 2.

WITNESSES:
Francis H. Anglin
J. P. Appleman

INVENTOR
W. T. Ebert
BY
H. C. Evert & Co.
ATTORNEYS

No. 622,944. Patented Apr. 11, 1899.
W. T. EBERT.
TRAP.
(Application filed Mar. 28, 1898.)
(No Model.) 3 Sheets—Sheet 3.
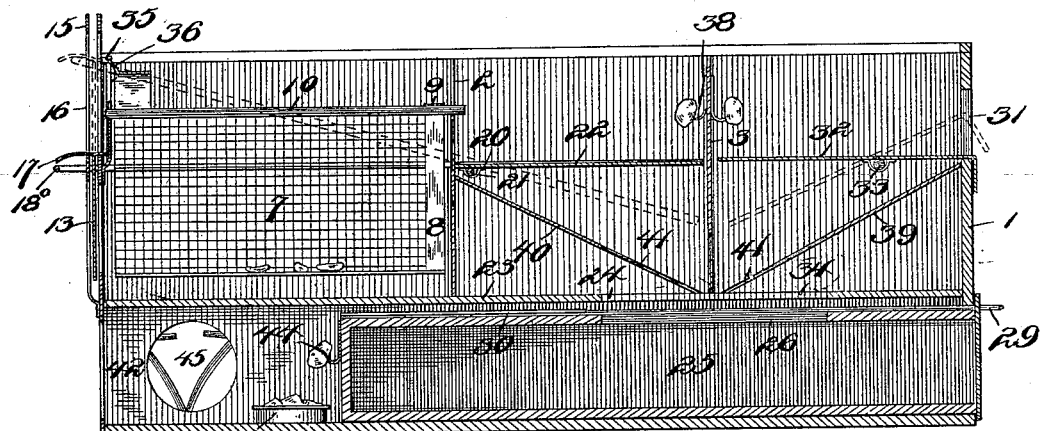
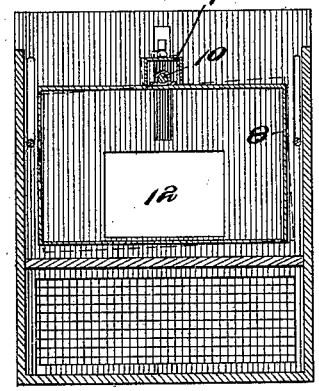
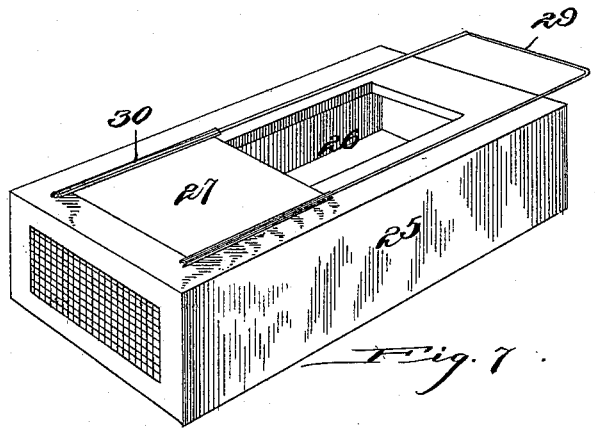
WITNESSES:
INVENTOR
W. T. Ebert.
BY
H. C. Evert & Co.
ATTORNEYS

UNITED STATES PATENT OFFICE.

WILLIAM T. EBERT, OF PITTSBURG, PENNSYLVANIA.

TRAP.

SPECIFICATION forming part of Letters Patent No. 622,944, dated April 11, 1899.

Application filed March 28, 1898. Serial No. 675,402. (No model.)

*To all whom it may concern:*

Be it known that I, WILLIAM T. EBERT, a citizen of the United States of America, residing at Pittsburg, in the county of Allegheny and State of Pennsylvania, have invented certain new and useful Improvements in Traps, of which the following is a specification, reference being had therein to the accompanying drawings.

This invention relates to certain new and useful improvements in traps, and relates particularly to that class of traps known as "vermin-traps," and has for its object to provide a trap of this class which may be employed for trapping various sizes of animals, from those known as "vermin" to the larger animals, such as foxes, rabbits, and the like.

The principal feature of my invention comprises a rocking cage or trap by which the door of the trap is caused to close after the vermin or other animal has entered within the cage. Novel means are also provided for supporting the door and for releasing the same automatically with the entering of the animal into the cage.

A still further object of the invention is to provide a trap in which the animal, after entering the cage and thereby springing the trap, so as to close the cage at the entrance, may pass from the cage to the supplemental apartment or apartments, from which escape through the entrance thereto is impossible.

All of this construction will be hereinafter particularly pointed out, and specifically described in the claims.

This application should be considered in connection with one filed by me April 8, 1897, Serial No. 631,304, and is an improvement thereon.

In describing the invention in detail reference is had to the accompanying drawings, forming a part of this specification, and wherein like figures of reference indicate similar parts throughout the several views, in which—

Figure 1:
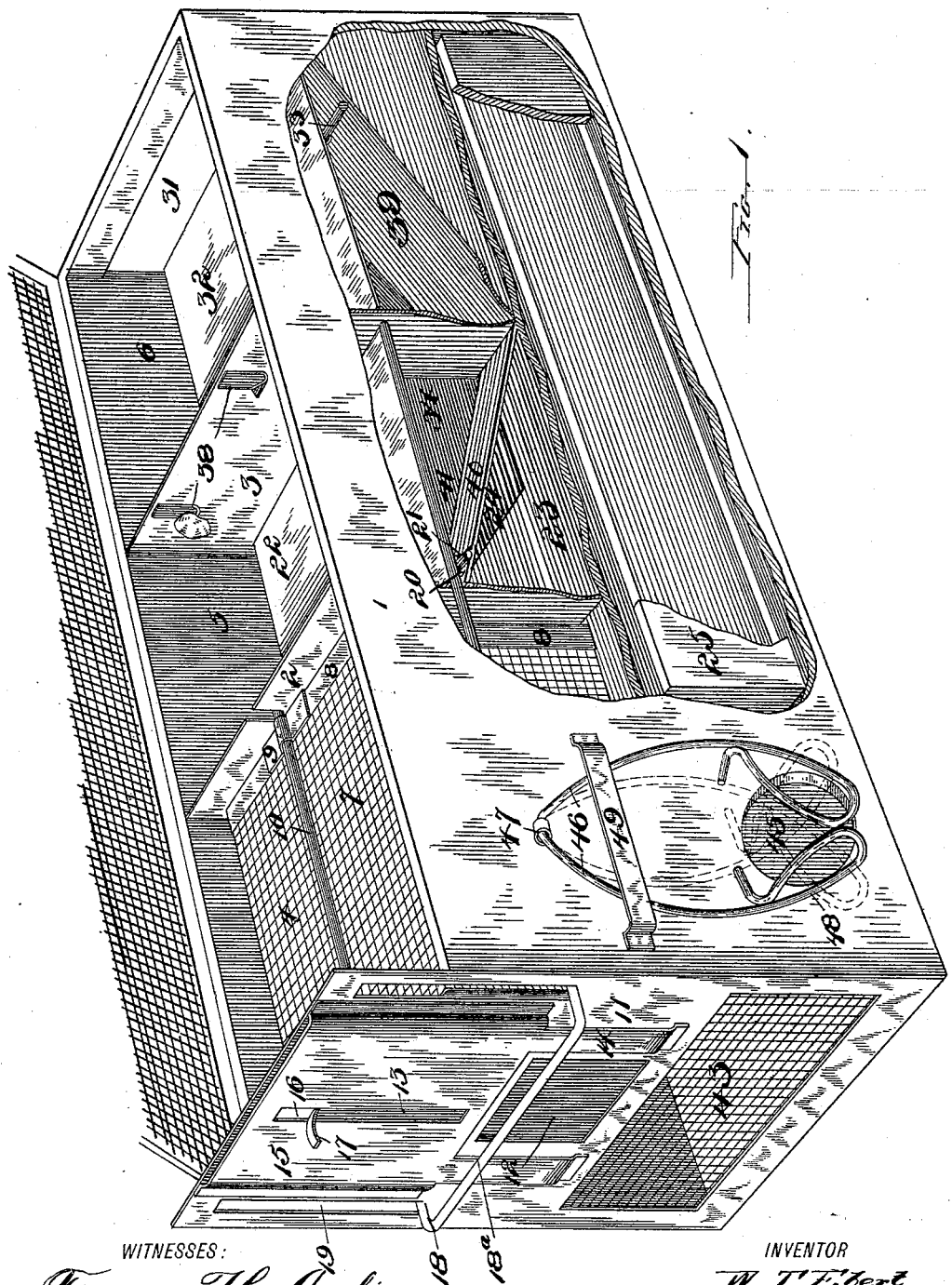
Figure 2:
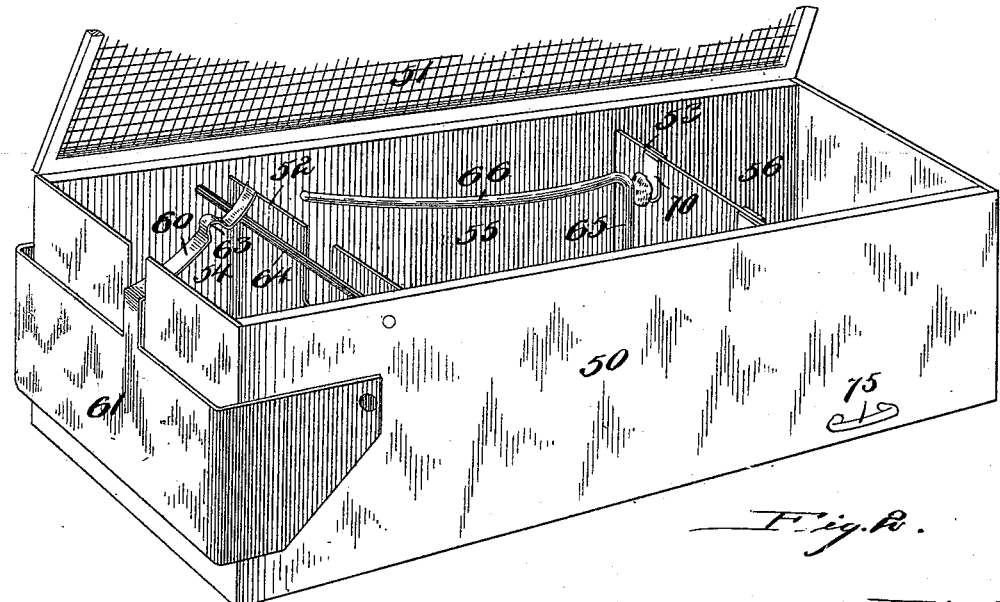
Figure 3:
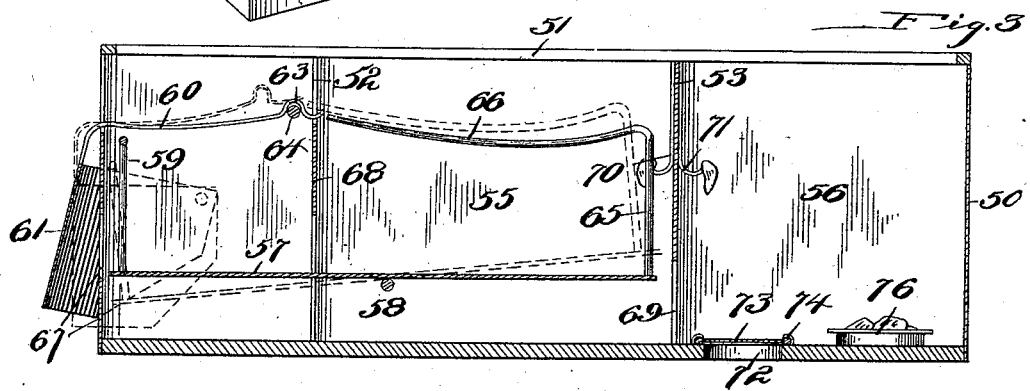
Figure 4:
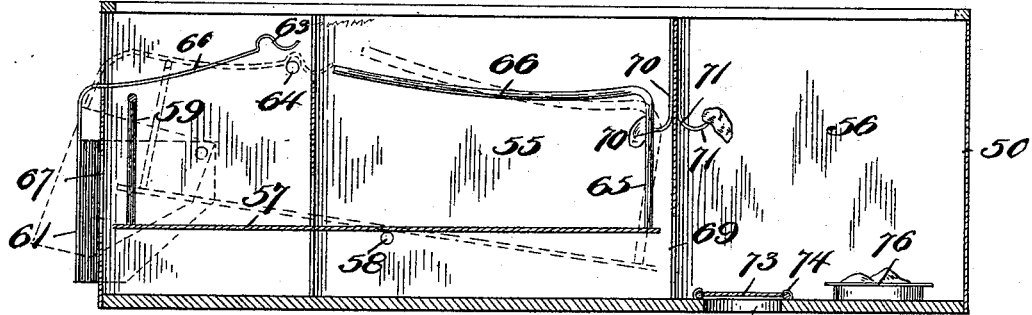

Figure 1 is a perspective view of my improved animal-trap with the lid or cover removed, the door of the cage being set and a portion of the trap being broken away to show the interior. Fig. 2 is a perspective view of a modified form of trap with the lid partly broken away to show the interior. Fig. 3 is a longitudinal sectional view of the same, showing the door set. Fig. 4 is a like view with the trap sprung, or, in other words, with the door closed. Fig. 5 is a longitudinal sectional view of Fig. 1. Fig. 6 is a transverse vertical sectional view of the same. Fig. 7 is a perspective view of the collecting-chamber employed in this form of trap.

Referring now to the drawings by reference-figures, 1 indicates the box or casing, which, although shown herein as oblong in form, may be of any desired shape and size. This box or casing is divided by partitions 2 3, thereby forming separate compartments 4, 5, and 6. In the apartment 4 is arranged the cage 7, which is or may be formed of wire-netting, as shown, having a suitable binding 8 around its rim for strengthening the same, and which may be formed on the upper side with keepers 9, which form journals for the supporting-shaft 10. This supporting-shaft is journaled in the partition 2 and in the front wall 11 of the box or casing, said front wall extending a slight distance above the box or casing, so as to permit the automatic resetting of the trap, as will be hereinafter explained.

The cage 7 being of less dimensions than the apartment within which it is located and the shaft 10 extending centrally across the top of the said compartment, it thereby permits a free rocking motion of the cage, and by this means the trap is automatically sprung. The front wall 11 is provided with an opening 12, which is closed by means of the door 13, operating between guides 14 and the said front wall 11, said guides being secured to the said front wall. This door also operates between the wall and the casing 15, which is secured to its front face and which is provided with a vertically-extending slot 16, through which the handle 17 of the door extends. This handle 17 is adapted to be engaged by a wire frame 18, operating in vertically-extending slots 19, provided therefor in the front wall 11, said frame extending inwardly in the box or casing 1 along the two sides of the cage, terminating at its inner end at the partition 3. It is supported at 20 by a transversely-extending shaft 21, that is journaled in the two side walls of the box or casing 1. Secured to this wire frame within the apartment 5 is a plate 22, which forms the floor of the said compartment and which tilts as the wire frame is moved to reset the trap.

The box or casing 1 has arranged therein a false bottom 23, which is provided with an opening 24, extending an equal distance on each side of the partition 3 and which registers with the opening 26, provided in the top of the collecting-chamber 25. This latter may extend the entire length of the cage or only a portion thereof, as may be desired, and has arranged on its top a sliding plate 27 for the purpose of closing the opening 26 when it is desired to remove the chamber 25 from the trap. This plate 27 may be operated by a wire frame or handle 29, operating in keepers 30, arranged therefor on the top of the box or chamber 25. The rear end of the box may be provided with an opening 31, and arranged within the same is a false bottom 32, supported by the transversely-extending shaft 33. This shaft is journaled in the two side walls of the box or casing 1 and so situated that the animal upon entering through the opening 31 will find the false floor 32 entirely stationary and rigid; but when passing over the shaft 33 within the apartment 6 it will cause the false floor to incline, and thereby precipitate the animal through the opening 34 in the partition 3 through the opening 24, the opening 26, and into the box or chamber 25. When the animal is within compartment 5 and passes beyond the shaft 21, this same operation will take place with the false floor 22, likewise precipitating the animal through the same openings into the box or chamber 25. The door of the cage is supported by means of a lug 35, which is or may be an extension of the handle 16 and which engages upon a catch 36, provided therefor on the top of the support or standard 37. This latter is mounted upon the cage 7, directly over the supporting-shaft 10, at the forward end of the cage. As the animal enters through the opening 12 and into the cage its movement causes the cage to rock upon its supporting-shaft 10 and thereby move the catch 36 out of engagement with the lug 35, and thus releasing the door permits the same to fall by reason of its own weight, and thereby closing the entrance to the cage. When the animal passes through the opening provided in the partition 2, so as to be upon the false floor 22, the weight of the animal as it passes over the fulcrum-point of the floor causes the latter to tip and precipitate the animal through the various openings, as heretofore described, into the box or chamber 25. This tilting of the floor 22 elevates the front rod 18ª of the wire frame 18 and brings the same into engagement with the handle 17, thus lifting the door and forcing the lug 35 above the catch 36, which it will engage as the door descends, and the trap is again set.

In order to attract the animals and to inveigle the same into passing from the cage to the apartment 5 and in a like manner to tempt the same to enter the opening 31 into the apartment 6, I provide bait-hooks 38 on each side of the partitions 3. The downward movement of the floors 22 and 32 may be limited by means of inclined partitions 39 40, arranged within the apartments 5 and 6 underneath the said floors 22 and 32, said inclined partitions being of course provided with openings 41, which register with the aforedescribed openings into the box or chamber 25. When this box or chamber is extended but a partial length of the trap, as is shown in the construction heretofore described, the chamber 42 in the front portion of the trap may be used as an auxiliary trap by providing the front wall with a netting 43 and locating within the chamber a bait-pan 43' and securing to the front box 25 a bait-hook 44. Entrance into this chamber 42 is had through the aperture or opening 45, provided in the one side of the box or casing 1, and which is adapted to be partially protected by a wire device which is sprung by the animal attempting to pass through the said opening 45. This wire device is formed of a single strand of wire 46, bent in substantially an oval form, and which is or may be supported at its closed end by an eyelet or keeper 47, secured in the side of the box or casing 1. The two ends of the strand are bent in substantially hook-shaped form, as shown at 48, and when the two strands are sprung apart these hooks rest against each other, but partially protect the opening 45. The animal in passing through the opening will of necessity have to crawl over the hooks at a point above where they abut against each other, and the engagement will disengage the hooks, allowing the same to spring together, so as to engage the animal, which has but partially entered through the opening. This device may be held in its position over the aperture 45 by a keeper 49, secured to the sides of the box.

In Fig. 2 I show a modification of my trap in which the box or casing 50 is provided with a suitable cover 51, which is or may be hinged thereto or secured rigidly, as desired. In this form of construction the box or casing is provided with the partitions 52 53, thereby forming the apartments 54, 55, and 56. The cage in this construction is of the open form, the floor 57 being supported by a shaft or rod 58, extending transversely of the box and journaled in the two sides. The floor 57 extends through the partition 53 and carries at its forward end a yoke 59, which is adapted to engage the arm 60, that is carried by the hood 61, which forms the door in this construction of trap. This hood is or may be formed of a single piece of material having its ends bent at right angles to the body portion and pivotally secured at 62 to the sides of the box. The arm 60 is provided at its free end with a hook 63, which is adapted to engage a transversely-extending rod 64, that is secured in the two side walls of the box. At its rear end the floor 57 has attached thereto an upwardly-extending arm 65, which extends forwardly into close proximity with the hook 63, and thereby acts as a lever 66 for releasing this hook from its engagement with the rod 64. When the hood 61 is raised, the hook 63 will be in engagement with its rod or shaft 64 and the lever 66 will be directly under the free end of the hook. When in this position, the floor will be tilted so as to bring the front of the same toward the base of the box and permit the animal to enter through the opening 67, provided in the front wall of the box or casing. As the animal enters through the said opening into the apartment 54 it will pass through the opening 68, provided in the partition 52, and when alighting upon the floor 57, within the apartment 55, causes this floor to assume a horizontal position, and thus bringing the lever 66 into engagement with the hook 63, releasing the same from its shaft and permitting the hood 61 to drop and thereby close the entrance into the trap. The animal will then be within the apartment 55, and in case it travels toward the rear end of the floor its weight will cause this floor to tilt, and the animal will be permitted to pass through the opening 69 in the partition 53 into the apartment 56. This tilting of the floor into the position shown in dotted lines in Fig. 4 brings the yoke or standard 59 into engagement with the arm 60, so as to again raise the hood 61 and engage the hook 63 with its supporting-rod 64, and the weight of the animal having been removed from the rear end of the floor 57 this floor returns to its normal position and the trap is again set. In order to attract the animal toward the rear end of the floor 57, I attach a bait-hook 70 to the partition 52 and may also provide a similar bait-hook 71 on the opposite side of the said partition. In this latter form of construction the bottom of the box or casing is provided with an opening 72, which may be normally closed by means of a slide 73, operating in guides 74. This slide 73 may have a handle 75 protruding through the side of the casing for operating said slide to open or close the opening or aperture 72. Within this apartment 56 I may provide a bait-pan 76 of the same form as shown in the other construction of traps.

Having fully described my invention, what I claim as new, and desire to secure by Letters Patent, is—

1. In a trap of the class described, a box having partitions dividing the box into separate compartments, said partitions being provided with openings adapted to register with the opening provided in the top of the collecting-box arranged within the first-mentioned box or casing, and a slide carried by said collecting-box for closing its opening, substantially as shown and described.

2. In a trap of the class described, the box or casing having a rocking cage therein, a sliding door, means carried by said cage for supporting the door, a tilting floor, means carried thereby for resetting the door after the same has been released, and a collecting-box arranged within the outer box, or casing, substantially as shown and described.

3. An animal-trap comprising a casing or box divided into a series of compartments by suitable partitions arranged therein, a cage mounted in one of said compartments and adapted to be rocked when the animal enters therein, a door for said cage, and a slide-bar arranged at the front of said casing adapted when operated to reset the trap when the animal leaves the cage, substantially as herein shown and described.

4. An animal-trap comprising a casing or box divided into a series of compartments by suitable partitions, a cage suspended in one of said compartments, a sliding door arranged at the front of said cage, means carried by said cage for supporting the door in an elevated position, and a slide-bar operated by the animal leaving the cage to reset the trap, substantially as herein shown and described.

5. In a device of the character described a box or casing, partitions arranged therein dividing the same into a series of compartments, a cage mounted in one of said compartments and adapted to rock freely therein, a door arranged in front of said cage and supported thereby, and means for automatically resetting the door when the same has been released, substantially as herein set forth.

6. An animal-trap comprising a box or casing, a rocking cage mounted therein, a pair of tilting floors mounted therein, a sliding door closing said cage and means carried by one of said tilting floors for resetting the door after the same has been released, substantially as shown and described.

7. A trap of the class described comprising a box or casing, a rocking cage arranged therein and a tilting floor mounted in said casing or box carrying means to reset the trap, substantially as set forth.

8. An animal-trap comprising a box or casing having partitions arranged therein dividing the same into a series of compartments, a tilting floor mounted in one of said compartments carrying means to reset the trap and a collecting-box arranged in said casing or box beneath the aforesaid partitions, substantially as herein set forth.

9. An animal-trap comprising a box or casing having partitions arranged therein dividing the same into a series of compartments, a rocking cage arranged in one of said compartments, tilting floors mounted in said casing or box, a sliding door, means carried by said cage for supporting said door and means carried by one of said tilting floors for resetting the trap, substantially as herein set forth.

In testimony whereof I affix my signature in the presence of two witnesses.

WILLIAM T. EBERT.

Witnesses:
A. M. WILSON,
ARTHUR HAYMAKER.